United States Patent [19]

Neal et al.

[11] Patent Number: 5,761,462
[45] Date of Patent: Jun. 2, 1998

[54] METHOD AND SYSTEM FOR SUPPORTING PERIPHERAL COMPONENT INTERCONNECT (PCI) PEER-TO-PEER ACCESS ACROSS MULTIPLE PCI HOST BRIDGES WITHIN A DATA-PROCESSING SYSTEM

[75] Inventors: Danny Marvin Neal, Round Rock; Steven Mark Thurber, Austin, both of Tex.

[73] Assignee: International Business Machines Corporation, Armonk, N.Y.

[21] Appl. No.: 766,736

[22] Filed: Dec. 13, 1996

[51] Int. Cl.[6] .............................. G06F 13/42; G06F 13/00
[52] U.S. Cl. .......................... 395/309; 395/308; 395/280
[58] Field of Search .................................. 395/280, 285, 395/306, 308, 309, 287, 288

[56] References Cited

U.S. PATENT DOCUMENTS

| | | | |
|---|---|---|---|
| 5,162,986 | 11/1992 | Graber et al. | 364/146 |
| 5,251,213 | 10/1993 | Videlock et al. | 370/85.12 |
| 5,379,384 | 1/1995 | Solomon | 395/325 |
| 5,446,869 | 8/1995 | Padgett et al. | 395/500 |
| 5,502,824 | 3/1996 | Heil | 395/293 |
| 5,506,997 | 4/1996 | Maguire et al. | 395/800 |
| 5,522,050 | 5/1996 | Amini et al. | 395/306 |
| 5,557,758 | 9/1996 | Bland et al. | 395/308 |
| 5,621,902 | 4/1997 | Cases et al. | 395/309 |
| 5,632,021 | 5/1997 | Jennings et al. | 395/309 |
| 5,664,124 | 9/1997 | Katz et al. | 395/309 |
| 5,673,399 | 9/1997 | Guthrie et al. | 395/308 |
| 5,692,219 | 11/1997 | Chan et al. | 395/869 |
| 5,696,949 | 12/1997 | Young | 395/551 |
| 5,712,986 | 1/1998 | Vo | 395/309 |

*Primary Examiner*—Gopal C. Ray
*Attorney, Agent, or Firm*—Richard A. Henkler; Antony P. Ng; Andrew J. Dillon

[57] ABSTRACT

A method for supporting peer-to-peer access across separate Peripheral Component Interconnect (PCI) host bridges within a data-processing system is described. In accordance with the method and system of the present invention, during an access request from a PCI device, a first determination is made as to whether or not the access request is for a system memory attached to a system bus. In response to a determination that the access request is not for a system memory attached to the system bus, another determination is made as to whether or not the access request is for a PCI device under the same PCI host bridge as the requesting PCI device. In response to a determination that the access request is not for a PCI device under the same PCI host bridge as the requesting PCI device, executing added protocols for the support of PCI peer-to-peer access request across separate PCI host bridges within the data-processing system.

18 Claims, 5 Drawing Sheets

METHOD AND SYSTEM FOR SUPPORTING PERIPHERAL COMPONENT INTERCONNECT (PCI) PEER-TO-PEER ACCESS ACROSS MULTIPLE PCI HOST BRIDGES WITHIN A DATA-PROCESSING SYSTEM

CROSS-REFERENCE TO RELATED APPLICATIONS

The present invention is related to the subject matter of the following co-pending applications:

United States Patent Application entitled "Method and System for Preventing Peripheral Component Interconnect (PCI) Peer-to-Peer Access Across Separate PCI Host Bridges Within a Data Processing System", filed Dec. 13, 1996, Ser. No. 08/766,735 and assigned to the assignee herein named;

United States Patent Application entitled "Method and System for translating Peripheral Component Interconnect (PCI) Peer-to-Peer Access Across Separate PCI Host Bridges Within a Computer System", filed Dec. 13, 1996 Ser. No. 08/766,737 and assigned to the assignee herein named.

The contents of both above-mentioned co-pending applications are incorporated by reference herein.

BACKGROUND OF THE INVENTION

1. Techincal Field

The present invention relates to a method and system for data processing in general and, in particular, to a method and system for handling Peripheral Component Interconnect (PCI) peer-to-peer accesses within a data-processing system. Still more particularly, the present invention relates to a method and system for supporting PCI peer-to-peer access across multiple PCI host bridges within a data-processing system.

2. Description of the Prior Art

A computer system or data-processing system typically includes a system bus. Attached to the system bus are various devices that may communicate locally with each other over the system bus. For example, a typical computer system includes a system bus to which a central processing unit (CPU) is attached and over which the CPU communicates directly with a system memory that is also attached to the system bus.

In addition, the computer system may include a local bus for connecting certain highly integrated peripheral components on the same bus as the CPU. One such local bus is known as the Peripheral Component Interconnect (PCI) bus. Under the PCI local bus standard, peripheral components can directly connect to a PCI local bus without the need for glue logic. Thus, PCI provides a bus standard on which high-performance peripheral devices, such as graphics devices and hard disk drives, can be coupled to the CPU, thereby permitting these high-performance peripheral devices to avoid the general access latency and the bandwidth constraints that would have occurred if these peripheral devices were connected to a standard peripheral bus. Details on the PCI local bus standard can be obtained under the PCI Local Bus Specification, Revision 2.1, from the PCI Special Interest Group, which is hereby incorporated by reference.

Generally, each system bus and local bus utilizes an independent set of protocols (or rules) to conduct data transfers between various devices attached to it. Each of these protocols is designed into a bus directly and is commonly referred to as the "architecture" of the bus. In a data transfer between different bus architectures, data being transferred from the first bus architecture may not be in a form that is usable or intelligible by the receiving second bus architecture. Accordingly, communication problems may occur when data must be transferred between different types of buses, such as transferring data from a PCI device on a PCI local bus to a CPU on a system bus. Thus, a mechanism is developed for "translating" data that are required to be transferred from one bus architecture to another. This translation mechanism is normally contained in a hardware device in the form of a bus-to-bus bridge (or interface) through which the two different types of buses are connected.

Incidentally, bus-to-bus bridges have been designed to match the communication protocol of one bus with that of another in order to permit system-wide communications between devices on different buses. For example, the bus-to-bus bridge connecting between a system bus and a PCI local bus is called a PCI host bridge. The PCI host bridge contains all the logic and hardware for translating data communications between the system bus and the PCI local bus, and ensures that data is transferred between these two buses intelligibly.

In a PCI-based system where there are multiple PCI host bridges, there needs to be a way, however, for a PCI host bridge to differentiate as to whether a PCI device, during a direct memory access (DMA) request, is trying to access the system memory or another PCI device. Further, if the requesting PCI device is trying to access another PCI device, the PCI host bridge also needs to determine whether the other PCI device is attached to the same PCI bus under the same PCI host bridge as the requesting PCI device or a different PCI bus under a different PCI host bridge from the requesting PCI device. Under the Common Hardware Reference Platform (CHRP), peer-to-peer traffic from a PCI device under one PCI host bridge to a PCI device under a different PCI host bridge is an acceptable operation; however, it does not define or require such operation. Similarly, the PCI Local Bus Specification is also silent as to this kind of peer-to-peer traffic. In fact, the PCI Local Bus Specification neither defines (or requires) peer-to-peer access across separate PCI host bridges nor disallows the possibly of such. However, if this undefined situation of peer-to-peer access across separate PCI host bridges is ignored, it may lead to indeterminate and undesirable results caused by the PCI host bridge involved in the attempted peerto-peer transaction. Consequently, it would be desirable to provide a method and system for supporting peer-to-peer access across separate PCI buses via separate PCI host bridges within a data-processing system.

SUMMARY OF THE INVENTION

In view of the foregoing, it is therefore an object of the present invention to provide an improved method and system for data processing.

It is another object of the present invention to provide an improved method and system for handling PCI peer-to-peer accesses within a data-processing system.

It is yet another object of the present invention to provide an improved method and system for supporting PCI peer-to-peer access across separate PCI host bridges within a data-processing system.

In accordance with the method and system of the present invention, during an access request from a PCI device, a first determination is made as to whether or not the access request is for a system memory attached to a system bus. In response to a determination that the access request is not for a system memory attached to the system bus, another determination is made as to whether or not the access request is for a PCI device under the same PCI host bridge as the requesting PCI device. In response to a determination that the access request is not for a PCI device under the same PCI host bridge as the requesting PCI device, executing added protocols for the support of PCI peer-to-peer access request across separate PCI host bridges within a data-processing system.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be applicable in a variety of computers under a number of different operating systems. The computer may be, for example, a personal computer, a mini-computer, or a mainframe computer. For the purpose of illustration, a preferred embodiment of the present invention, as described below, is implemented on a mini-computer, such as the RS/6000™ series manufactured by International Business Machines Corporation.

Figure 1:
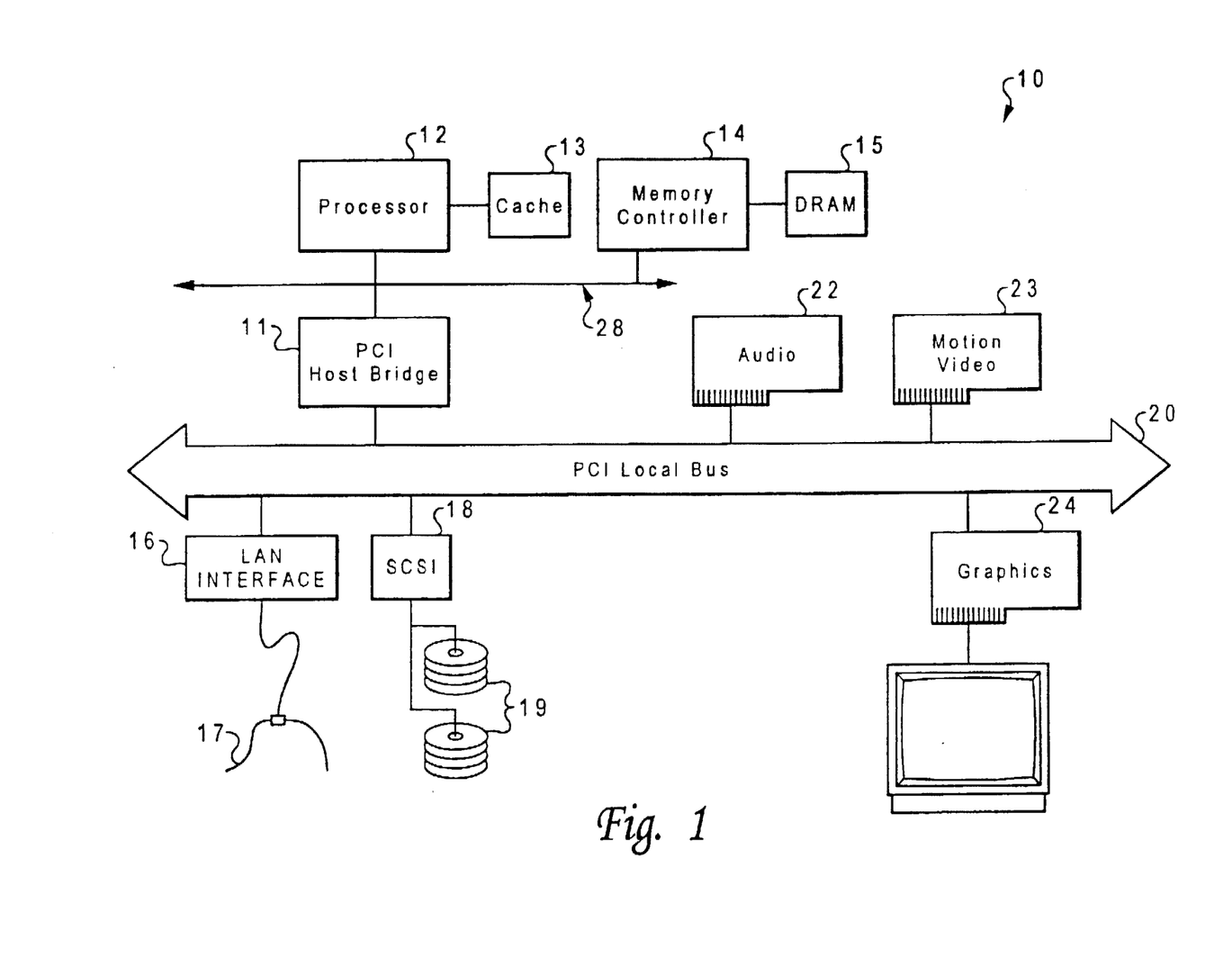
FIG. 1 is a block diagram of a typical computer system having a PCI local bus architecture, which may utilize a preferred embodiment of the present invention.

Referring now to the drawings and in particular to FIG. 1, there is depicted a block diagram of a typical computer system having a PCI local bus architecture, which may utilize a preferred embodiment of the present invention. As shown, a processor 12, a cache memory 13, a memory controller 14, and a Dynamic Random Access Memory (DRAM) 15 are connected to a system bus 28 of a computer system 10. Processor 12, cache memory 13, memory controller 14, and DRAM 15 are also coupled to a PCI local bus 20 of computer system 10 through a PCI host bridge 11. PCI host bridge 11 provides a low latency path through which processor 12 may directly access PCI devices mapped anywhere within bus memory and/or I/O address spaces. PCI host bridge 11 also provides a high bandwidth path allowing PCI masters direct access to DRAM 15. PCI host bridge 11 may include various functions such as data buffering/posting and arbitration.

Also attaching to PCI local bus 20 may be other devices such as a local-area network (LAN) interface 16, a small computer system interface (SCSI) 18. LAN interface 16 is for connecting computer system 10 to a local-area network 17 such as ethernet or token-ring. SCSI 18 is utilized to control high-speed SCSI disk drives 19.

In general, PCI local bus 20 may support up to four add-in board connectors without requiring any expansion capability. Audio adaptor board 22, motion video adaptor board 23, and graphics adaptor board 24 are examples of some devices that may be attached to PCI local bus 20 via add-in board connectors.

Figure 2:
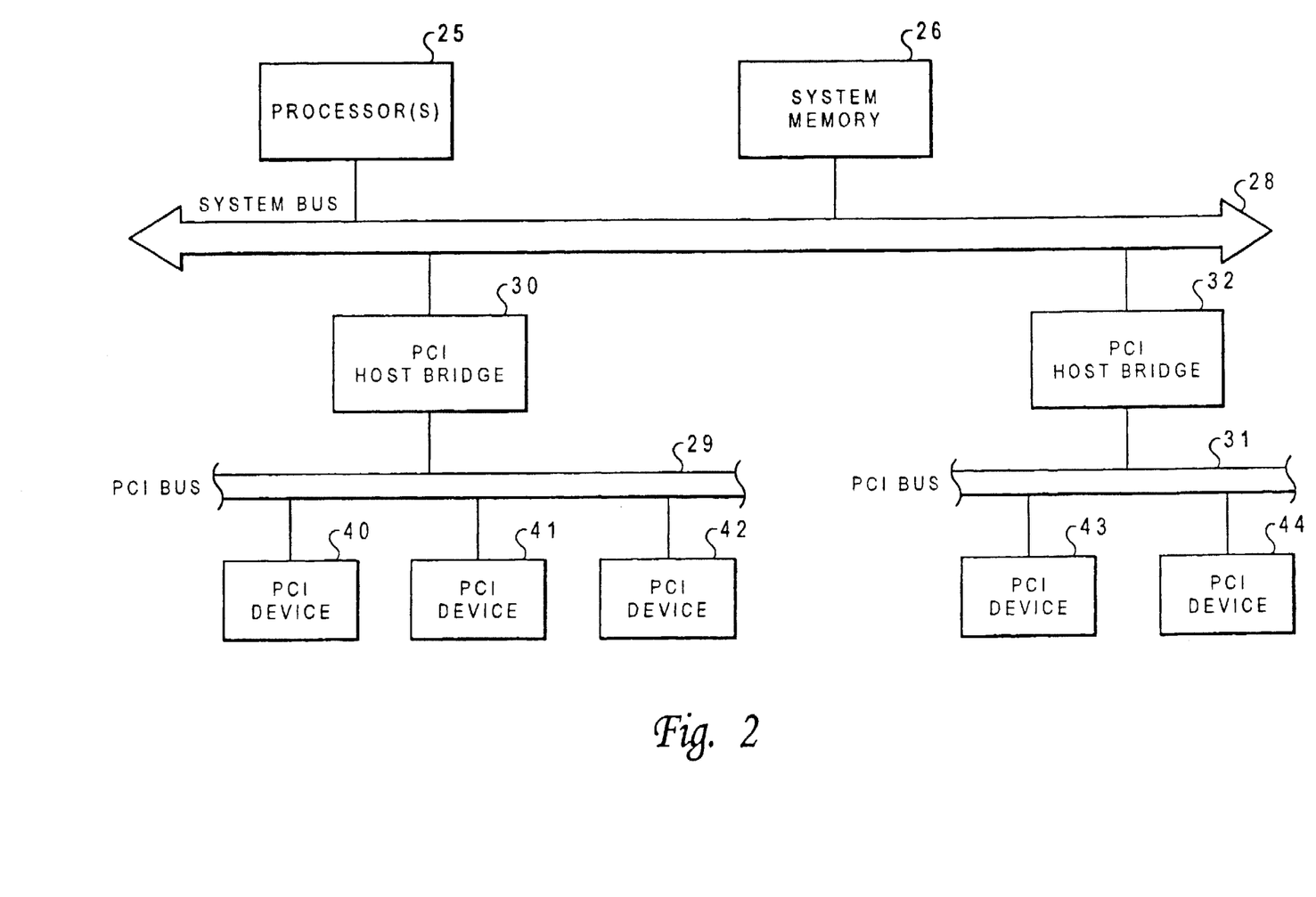
FIG. 2 is a block diagram of a configuration having separate PCI local buses under separate PCI host bridges, in accordance with a preferred embodiment of the present invention.

With reference now to FIG. 2, there is illustrated a configuration having separate PCI local buses under separate PCI host bridges, according to a preferred embodiment of the present invention. As shown, processor(s) 25 and a system memory 26 are coupled for communication over a system bus 28. In a preferred embodiment, system bus 28 provides a 32-bit memory address space and a 16-bit I/O address space. A PCI host bridge 30 enables communications between bus agents coupled to system bus 28 and bus agents coupled to a PCI local bus 29.

PCI devices 40–42 are bus agents coupled for communication over PCI local bus 29. In addition, PCI host bridge 30 is coupled as a bus agent for communication over PCI local bus 29. PCI host bridge 30 has the capability to be an initiator and a target for the access cycle over PCI local bus 29. In a preferred embodiment, PCI local bus 29 comprises 32-bit memory address and 32-bit I/O address spaces, having addresses and data multiplexed over the same bus.

A bus bridge, such as PCI host bridge 30, is coupled between a primary bus and a secondary bus. A bus bridge enables an access request that initiates on the primary bus to have a destination on the secondary bus, and enables an access request that initiates on the secondary bus to have a destination on the primary bus. For example, after receiving an access request from system bus 28, PCI host bridge 30 will initiate an access request on PCI local bus 29 to communicate with one or more of PCI devices 40–42. Or, after receiving an access request from PCI local bus 29, PCI host bridge will initiate an access request on system bus 28 to communicate with system memory 26.

In addition to PCI host bridge 30, a PCI host bridge 32 is also attached to system bus 28. Similar to PCI host bridge 30, PCI host bridge 32 enables communications between bus agents coupled to system bus 28 and bus agents coupled to a PCI local bus 31. Attaching to PCI local bus 31 are PCI device 43 and PCI device 44.

Figure 3:
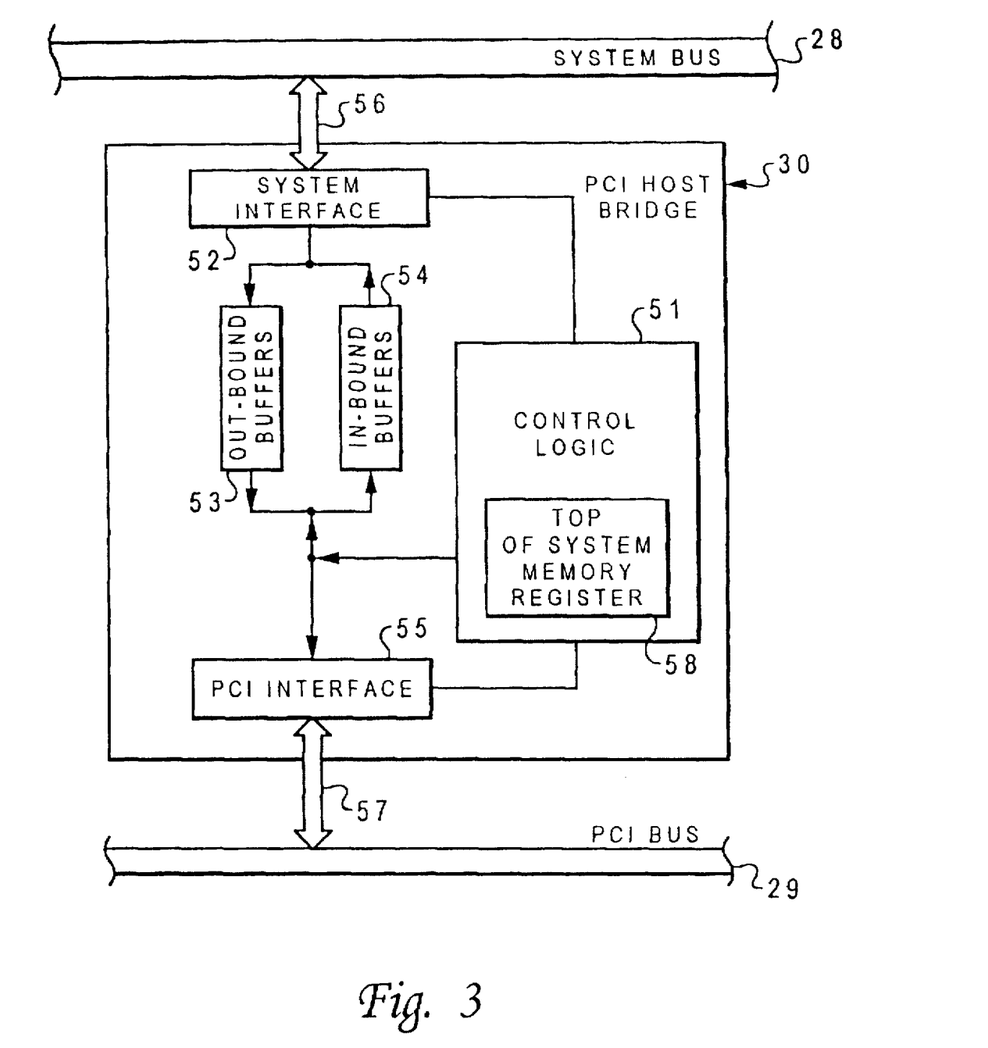
FIG. 3 is a block diagram of a PCI host bridge in accordance with a preferred embodiment of the present invention.

Referring now to FIG. 3, there is depicted a block diagram of a PCI host bridge in accordance with a preferred embodiment of the present invention. As shown, PCI host bridge is coupled to system bus 28 via system interface 52 and bus 56. Similarly, PCI host bridge is coupled to PCI local bus 29 via PCI interface 55 and bus 57. Any in-bound transaction traffic travelling from PCI interface 55 to system interface 52 are handled through in-bound buffers 54. On the other hand, any out-bound transaction traffic travelling from system interface 52 to PCI interface 55 are handled through out-bound buffers 53. The in-bound transaction traffic and the out-bound transaction traffic are directed by a state machine within control logic 51. This state machine controls a first set of transaction router (not shown) and transaction selection (not shown) for in-bound data and a second set of transaction router and transaction selection for out-bound data. In addition, control logic 51 may also include functions such as address decoding, data buffering, and other PCI control functions such as arbitration. A top-of-system-memory register 58 is preferably included within control logic 51 for a purpose that will be described infra.

Figure 4:
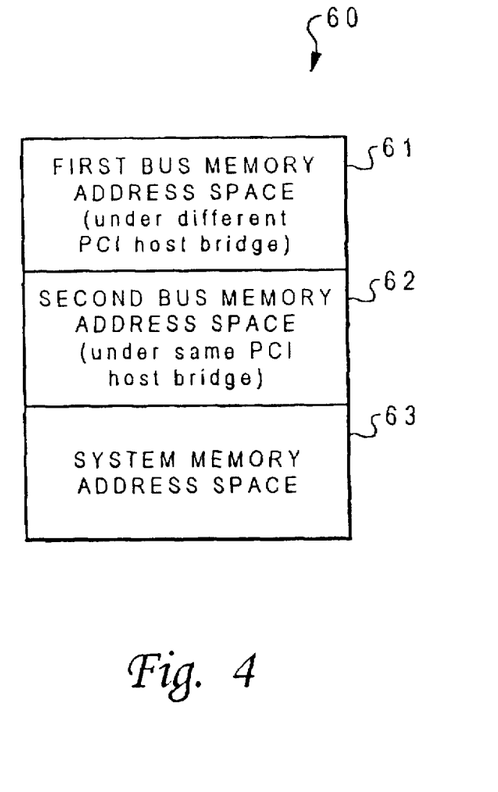
FIG. 4 is a block diagram of a memory map to be utilized by the PCI host bridge of FIG. 3, in accordance with a preferred embodiment of the present invention.

With reference now to FIG. 4, there is depicted a block diagram of a memory map to be utilized by the PCI host bridge of FIG. 3, in accordance with a preferred embodiment of the present invention. As shown, memory map 60 comprises a first bus memory address space 61, a second bus memory address space 62, and a system memory address space 63. System memory address space 63 is contiguous such that address space 63 does not have any other address, such as bus memory address, interspersed within. Similarly, first bus memory address space 61 and second bus memory address space 62 are also separately contiguous such that address space 61 and address space 62 do not have any other address interspersed within.

Generally, when a PCI device on a PCI local bus performs a direct memory access (DMA) request, such access request may be for the system memory, for the same address space under the same PCI host bridge as the requesting PCI device, or for an address space under another PCI host bridge. As a preferred embodiment of the invention, an access request to the system memory is indexed to system memory address space 63, while an access request to a PCI device under the same PCI host bridge as the requesting PCI device is indexed to second bus memory address space 62. First bus memory address space 61 is specifically reserved for any access request to a PCI device that is under a different PCI host bridge. Any address space that is above system memory address space 63 in memory map 60 is considered above the top-of-system memory Hence, by utilizing top-of-system-memory register 58, an access request for the system memory can be distinguished from an access request for a PCI device under the same PCI host bridge as the requesting PCI device, or for a PCI device under a different PCI host bridge. Because the decoding for access request under the same PCI host bridge may be done anyway, the additional compare on this new top-of-system memory decode can be combined with the decoding to determine when the access request is for a PCI device under a different PCI host bridge. That is, if the address to be accessed is above system memory address space 63 and is not for a PCI device under the same PCI host bridge as the requesting PCI device, such access request must be for a PCI device under a different PCI host bridge.

By having a top-of-system-memory register 58 to indicate the top-of-system memory, the top-of-system memory can be programmable. Thus, when the computer system is initialized, the amount of system memory is determined and the proper value may be programmed into top-of-system-memory register 58 or by utilizing range registers that are based on how the system memory address space 63 is mapped into address map 60.

One skilled in the art will appreciate that the arrangement of address spaces in memory map 60 of FIG. 4 is only one example of many possible ways in which the system memory, the bus memory, and any other bus memory can be mapped. As mentioned previously, range registers can also be utilized within a PCI host bridge to be programmed to detect each of the assigned address spaces.

Figure 5:
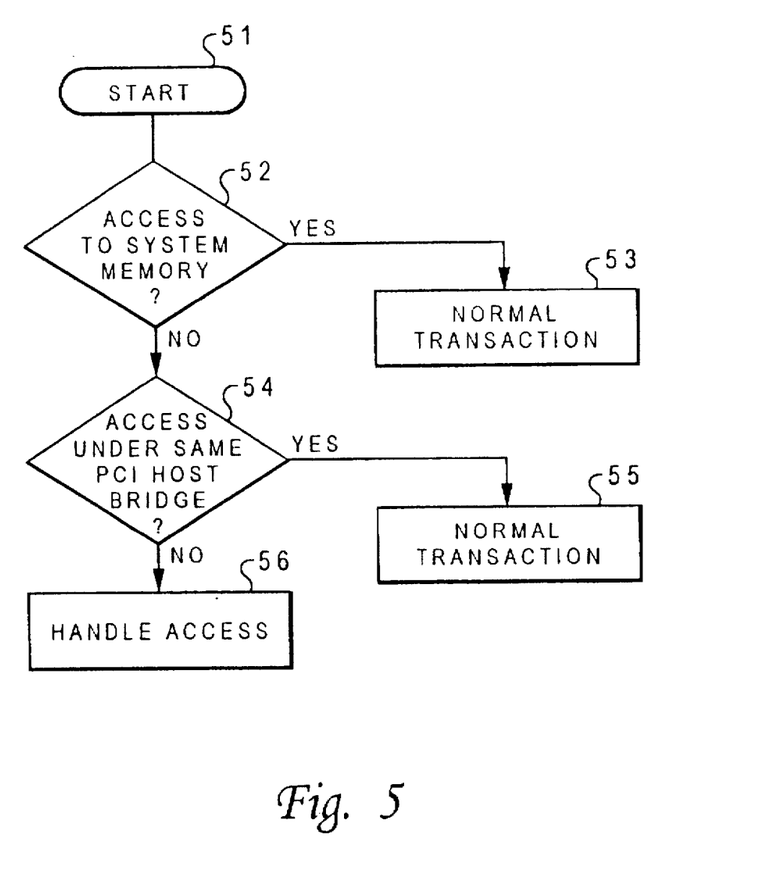
FIG. 5 is a high-level logic flow diagram of a method for supporting peer-to-peer access across separate PCI host bridges within a data-processing system, in accordance with a preferred embodiment of the present invention.

Referring now to FIG. 5, there is illustrated a high-level logic flow diagram of a method for supporting peer-to-peer access across separate PCI host bridges within a data-processing system, in accordance with a preferred embodiment of the present invention. Starting at block 51, a determination is made as to whether or not an access request from a PCI device attached to the PCI local bus is for a system memory attached to the system bus, as shown in block 52. If the access request is for a system memory attached to the system bus, then normal transaction is performed to the system memory according to the PCI Local Bus Specification, as depicted in block 53.

However, if the access request is not for a system memory attached to the system bus, then another determination is made as to whether or not the target PCI device is under the same PCI host bridge as the requesting PCI device, as shown in block 54. If the target PCI device is under the same PCI host bridge as the requesting PCI device (such as an access request from PCI device 40 to PCI device 42 in FIG. 2), then normal transaction is performed according to the PCI Local Bus Specification, as depicted in block 55.

Otherwise, if the target PCI device is not under the same PCI host bridge as the requesting PCI device (such as an access request from PCI device 40 to PCI device 43 in FIG. 2), then the access request for a PCI device under a different PCI host bridge is handled, as shown in block 56.

In handling peer-to-peer transactions, added capabilities and rules must be followed. For illustration purposes, a source PCI host bridge is the PCI host bridge under which a requesting PCI device is located, and a target PCI host bridge is the PCI host bridge under which a target PCI device is located. Once it is determined that the access request is for a device under a target PCI host bridge, several means are provided in the control logic of a source PCI host bridge to:

accept the peer-to-peer access request, properly route the access request, buffer the access request, and track the access as a peer-to-peer transaction as required.

A 64-bit PCI peer-to-peer access (read or write) that is broken up by the source PCI host bridge must be presented to the target PCI device with sequentially incrementing addresses, and the first address presented to the target PCI device must be the same as the first address presented by the device that originated the peer-to-peer operation. In handling a peer-to-peer read operation, the target PCI host bridge must not indicate a valid Byte Enable for any bytes that are not requested at the source PCI host bridge, unless one or more 0 Byte Enables is between two valid Byte Enables. In handling a peer-to-peer write operation, the target PCI host bridge must not indicate a valid Byte Enable for any bytes that are not valid at the source PCI host bridge. Moreover, a subsequent peer-to-peer read or write request destined for a PCI bus peripheral memory or peripheral I/O spaces must be prevented from being passed to the PCI bus before a previous peer-to-peer write request has been passed to the PCI bus.

As has been described, the present invention provides an improved method and system for supporting peer-to-peer access across separate PCI host bridges within a data-processing system. Although PCI host bridges are not required by the PCI local bus architecture to support accesses from one PCI host bridge to another PCI host bridge, it is crucial for the PCI host bridge not to corrupt the computer system if such accesses are attempted.

While the invention has been particularly shown and described with reference to a preferred embodiment, it will be understood by those skilled in the art that various changes in form and detail may be made therein without departing from the spirit and scope of the invention.

What is claimed is:

1. A method for supporting peer-to-peer access across separate Peripheral Component Interconnect (PCI) host bridges within a data-processing system, said method comprising the steps of:

determining whether or not an access request from a PCI device is for a system memory attached to a system bus;

in response to a determination that an access request is not for a system memory attached to a system bus, determining whether or not said access request is for a PCI device under a same PCI host bridge as said requesting PCI device; and     in response to a determination that said access request is not for a PCI device under a same PCI host bridge as said requesting PCI device, executing a set of protocols for supporting said access request across separate PCI host bridges within said data-processing system.

2. The method for supporting peer-to-peer access across separate PCI host bridges within a data-processing system according to claim 1, wherein said method further includes a step of performing a normal transaction in accordance with the PCI Local Bus Specification, in response to a determination that an access request is for a system memory attached to a system bus.

3. The method for supporting peer-to-peer access across separate PCI host bridges within a data-processing system according to claim 1, wherein said method further includes a step of performing a normal transaction in accordance with the PCI Local Bus Specification, in response to a determination that an access request is for a PCI device under a same PCI host bridge as said requesting PCI device.

4. The method for supporting peer-to-peer access across separate PCI host bridges within a data-processing system according to claim 1, wherein said step of determining whether or not an access request from a PCI device is for a system memory attached to a system bus is performed by utilizing a top-of-system-memory register.

5. The method for supporting peer-to-peer access across separate PCI host bridges within a data-processing system according to claim 1, wherein said executing step further includes a step of preventing a subsequent peer-to-peer read request destined for a PCI bus peripheral memory or peripheral I/O spaces from being passed to a PCI local bus before a previous peer-to-peer write request has been passed to said PCI local bus.

6. The method for supporting peer-to-peer access across separate PCI host bridges within a data-processing system according to claim 1, wherein said executing step further includes a step of preventing a subsequent peer-to-peer write request destined for a PCI bus peripheral memory or peripheral I/O spaces from being passed to a PCI local bus before a previous peer-to-peer write request has been passed to said PCI local bus.

7. The method for supporting peer-to-peer access across separate PCI host bridges within a data-processing system according to claim 1, wherein said executing step further includes a step of presenting peer-to-peer 64-bit read or write accesses that are broken up by a PCI host bridge to a target PCI device with sequentially incrementing addresses, and the first address presented to said target PCI device must be the same as the first address presented by the device that originated said peer-to-peer access.

8. The method for supporting peer-to-peer access across separate PCI host bridges within a data-processing system according to claim 1, wherein said executing step further includes a step of not indicating a valid Byte Enable for any bytes that are not requested at a source PCI host bridge, unless 0 Byte Enables are between two valid Byte Enables, when handling a peer-to-peer read operation.

9. The method for supporting peer-to-peer access across separate PCI host bridges within a data-processing system according to claim 1, wherein said executing step further includes a step of not indicating a valid Byte Enable for any bytes that are not valid at a source PCI host bridge when handling a peer-to-peer write operation.

10. A computer system having an architecture for supporting peer-to-peer access across separate PCI host bridges, said computer system comprising:

means for determining whether or not an access request from a PCI device is for a system memory attached to a system bus;

means for determining whether or not said access request is for a PCI device under a same PCI host bridge as said requesting PCI device, in response to a determination that an access request is not for a system memory attached to a system bus; and     means for executing a set of protocols for handling said access request, in response to a determination that said access request is not for a PCI device under a same PCI host bridge as said requesting PCI device, such that said PCI peer-to-peer access across separate PCI host bridges within said computer system is supported.

11. The computer system having an architecture for supporting peer-to-peer access across separate PCI host bridges according to claim 10, wherein said computer system further includes a means for performing a normal transaction in accordance with the PCI Local Bus Specification, in response to a determination that an access request is for a system memory attached to a system bus.

12. The computer system having an architecture for supporting peer-to-peer access across separate PCI host bridges according to claim 10, wherein said computer system further includes a means for performing a normal transaction in accordance with the PCI Local Bus Specification, in response to a determination that an access request is for a PCI device under a same PCI host bridge as said requesting PCI device.

13. The computer system having an architecture for supporting peer-to-peer access across separate PCI host bridges according to claim 10, wherein said means for determining whether or not an access request from a PCI device is for a system memory attached to a system bus further includes a top-of-system-memory register.

14. The computer system having an architecture for supporting peer-to-peer access across separate PCI host bridges according to claim 10, wherein said executing means further includes a means for preventing a subsequent peer-to-peer read request destined for a PCI bus peripheral memory or peripheral I/O spaces from being passed to a PCI local bus before a previous peer-to-peer write request has been passed to said PCI local bus.

15. The computer system having an architecture for supporting peer-to-peer access across separate PCI host bridges according to claim 10, wherein said executing means further includes a means for preventing a subsequent peer-to-peer write request destined for a PCI bus peripheral memory or peripheral I/O spaces from being passed to a PCI local bus before a previous peer-to-peer write request has been passed to said PCI local bus.

16. The computer system having an architecture for supporting peer-to-peer access across separate PCI host bridges according to claim 10, wherein said executing means further includes a means for presenting peer-to-peer 64-bit read or write accesses that are broken up by a PCI host bridge to a target PCI device with sequentially incrementing addresses, and the first address presented to said target PCI device must be the same as the first address presented by the device that originated said peer-to-peer access.

17. The computer system having an architecture for supporting peer-to-peer access across separate PCI host bridges according to claim 10, wherein said executing means further includes a means for not indicating valid Byte Enables for bytes that are not requested at a source PCI host bridge, unless 0 Byte Enables are between two valid Byte Enables, when handling a peer-to-peer read operation.

18. The computer system having an architecture for supporting peer-to-peer access across separate PCI host bridges according to claim 10, wherein said executing means further includes a means for not indicating valid Byte Enable for bytes that are not valid at a source PCI host bridge when handling a peer-to-peer write operation.

* * * * *